United States Patent [19]

Gleim

[11] Patent Number: 5,043,565

[45] Date of Patent: Aug. 27, 1991

[54] PROCESS AND CIRCUIT FOR COMPENSATING CHANGES

[75] Inventor: Günter Gleim, VS-Villingen, Fed. Rep. of Germany

[73] Assignee: Deutsche Thomson-Brandt GmbH, VS-Villingen, Fed. Rep. of Germany

[21] Appl. No.: 138,520

[22] PCT Filed: Dec. 4, 1986

[86] PCT No.: PCT/EP86/00708

§ 371 Date: Aug. 24, 1987

§ 102(e) Date: Aug. 24, 1987

[87] PCT Pub. No.: WO87/03700

PCT Pub. Date: Jun. 18, 1987

[30] Foreign Application Priority Data

Dec. 11, 1985 [DE] Fed. Rep. of Germany ....... 3543666

[51] Int. Cl.[5] .......................... G05D 25/02; G01J 1/32
[52] U.S. Cl. ...................................... 250/205; 315/151
[58] Field of Search .......................... 250/205; 315/151

[56] References Cited

U.S. PATENT DOCUMENTS 3,436,553 4/1969 Bevis.
4,203,032 5/1980 Haunstetter et al. ............... 250/205

FOREIGN PATENT DOCUMENTS 2142988 3/1972 Fed. Rep. of Germany.
57-36366 2/1982 Japan.
1174678 12/1969 United Kingdom.

Primary Examiner—Edward P. Westin
Attorney, Agent, or Firm—Max Fogiel

[57] ABSTRACT

An arrangement for compensating against changes in parameters of an optical emitter and an optical receiver in an optical scanner that detects different luminosities. The optical receiver is exposed to light from the optical emitter and provides an output voltage that is compared with a reference voltage. The output voltage is clamped to the reference voltage when the light received by the optical receiver has energy of an extreme value. The receiver detects light of varying brightness between maximum brightness and minimum brightness, and will operate at any durations of varied brightness levels. The receiver distinguishes between maximum brightness and minimum brightness, and when the brightness has a step-shape, a stair-shape function is provided by the receiver output voltage. The output voltage of the receiver is clamped to the reference voltage when the light energy received by the optical receiver attains either a maximum or a minimum.

2 Claims, 2 Drawing Sheets

PROCESS AND CIRCUIT FOR COMPENSATING CHANGES

The invention concerns a method of compensating for changes in the parameters of an optical emitter and an optical receiver in an optical scanner that detects different luminosities, whereby the optical receiver receives light from the optical emitter.

Optical scanners are employed for example in light barriers and reflex couplers.

Reflex couplers are described in AEG-Telefunken, Reflexkoppler CNY 70, Halbleiterinformationsdienst 7.81.

The optical emitter in a reflex coupler beams light onto an object, which reflects it onto an optical receiver. A reflex coupler can be employed for example to determine whether the object is moving, rotating, or changing its position or reflectivity. Table 1 on page 1 of the aforesaid reference lists fields of application for reflex couplers. To recognize colors or read marks the reflex coupler must be able to distinguish various luminosities because the object varies its reflectivity. The same problem occurs in a light barrier, wherein the optical emitter and the optical receiver are directly opposite each other, when translucent objects that can attenuate the light to different extents are inserted between the emitter and the receiver. In order for example to evaluate the different shades of gray of a filter inserted between the emitter and the receiver the receiver must emit a different signal for every shade, so that the different shades can be differentiated by means of the different output signals. The same output signal must always be released in relation to the same shade of gray, so that the evaluation can be reversed.

The requirement of reversibility cannot be satisfied in a simple system consisting of an optical emitter and an optical receiver because the parameters of the emitter and of the receiver vary with temperature and age. In the aforesaid example for instance the same shade of gray does not always result in the same output signal at the receiver as would be desired. Precise evaluation of various luminosities or shades of gray is impossible with optical emitters and optical receivers alone due to variations in temperature and aging on the part of the components.

The object of the invention is a method that can be employed with an optical scanner and that will compensate for changes in the parameters of the optical emitter and optical receiver due to temperature variations and aging.

This object is attained in accordance with the invention in that the output voltage $U_A$ of the optical receiver E is compared with a reference voltage $U_K$ and in that the output voltage $U_A$ is clamped to the reference voltage when the energy of the light received by the optical receiver assumes an extreme value.

IN THE DRAWING

Figure 1:
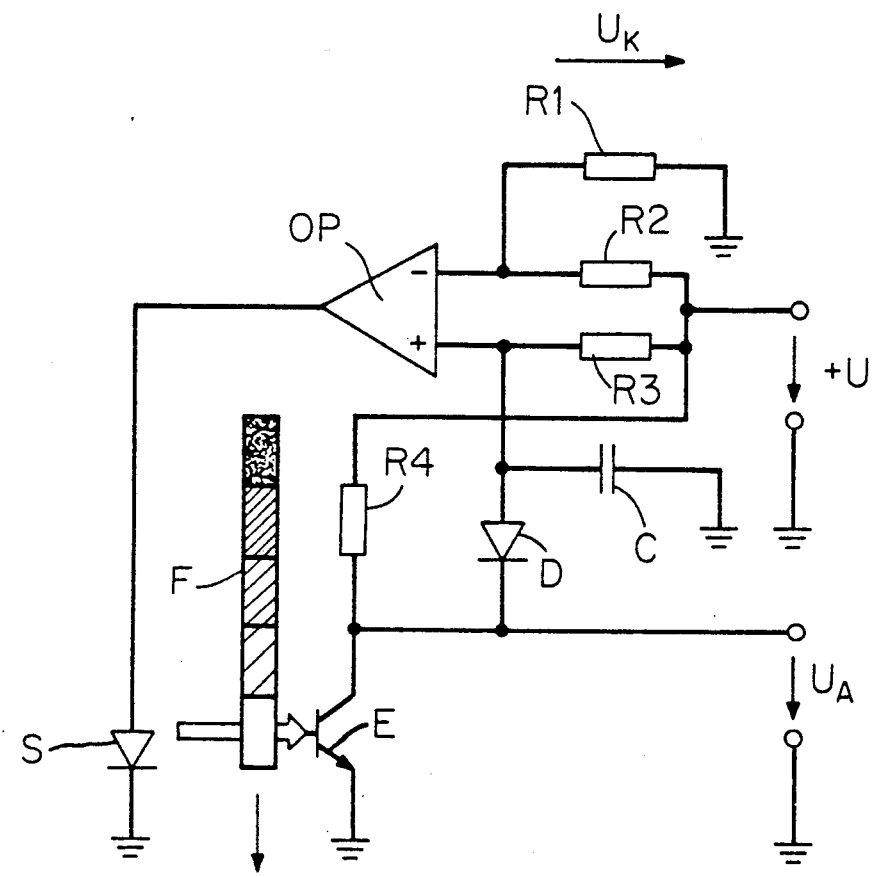
FIG. 1 illustrates circuitry for carrying out the method recited in claim 2.

The output terminal of the operational amplifier OP illustrated in FIG. 1 is connected to the anode of an optical emitter in the form of a photodiode S, the cathode of which is at reference potential. The inverting input terminal of operational amplifier OP is also connected to reference potential through a first resistor R1 and to a voltage $+U$ through another resistor R2. The non-inverting input terminal of operational amplifier OP is connected to voltage $+U$ through a third resistor, R3 and to reference potential through a capacitor C. The non-inverting input terminal of operational amplifier OP is also connected to the anode of a diode D, the cathode of which is connected to voltage $+U$ through a fourth resistor R4 and to the collector of an optical receiver in the form of a phototransistor E. The emitter of phototransistor E is at reference potential. Output voltage $U_A$ is picked up at the collector of phototransistor E.

Figure 2:
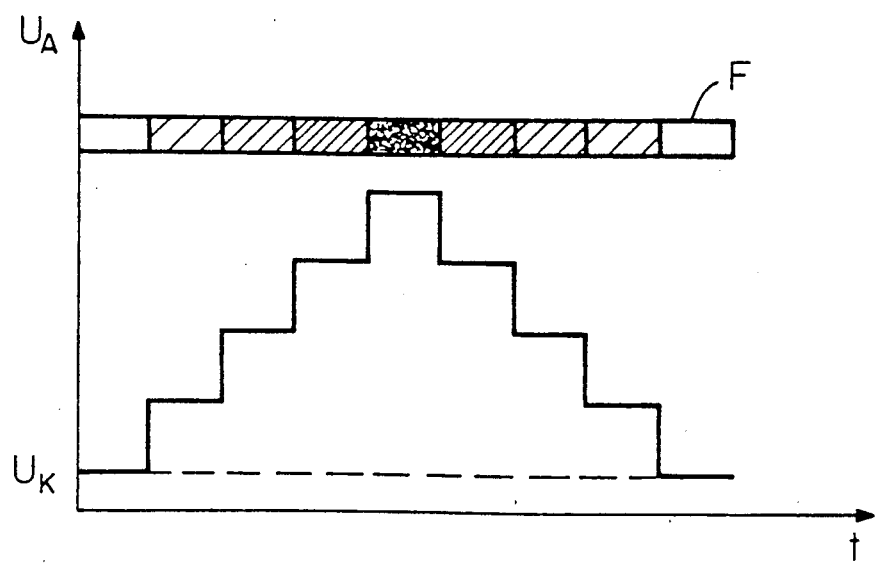
FIG. 2 illustrates output voltage $U_A$ as a function of the shades of gray of a filter F.

The circuitry illustrated in FIG. 1 will now be specified with reference to the graph in FIG. 2.

The output voltage $U_A$ picked up at the collector of phototransistor E is plotted as a function of the shades of gray of a filter F in FIG. 2.

To facilitate comprehension of the circuitry illustrated in FIG. 1 let it be assumed that the shade of filter F that attenuates the least light initially rests between photodiode S and phototransistor E. Due to the voltage distributor composed of first resistor R1 and second resistor R2 the potential at the inverting input terminal of operational amplifier OP will have a constant value. The resulting constant voltage between the inverting input terminal of operational amplifier OP and reference potential will be called clamp voltage $U_K$ herein from now on. Operational amplifier OP now changes its output voltage and hence the emission power of photodiode S until the voltage between its two input terminals becomes zero. Since the two input terminals of operational amplifier OP are at the same potential, clamp voltage $U_K$ will drop at capacitor C as well as at first resistor R1. Assuming that diode D is an ideal diode, the output voltage $U_A$ at the collector of phototransistor E will assume the value of clamp voltage $U_K$ because operational amplifier OP will as aforesaid continue to vary its output voltage and hence the emission power of photodiode S until the resistance of phototransistor E assumes precisely the value at which the clamp voltage $U_K$ at the collector-emitter section will drop. The collector of phototransistor E and both the inverting and non-inverting input terminal of operational amplifier OP will now all be at the same potential, assuming that diode D is an ideal component. Actually, however, the voltage at the collector-emitter section of phototransistor E will be lower than clamp voltage $U_K$ by a factor equaling the diode voltage.

If, now, the filter F between photodiode S and phototransistor E is displaced in such a way that the attenuation will increase from shade to shade, the resistance of phototransistor E will also increase. Since the potential at the collector of phototransistor E will accordingly become positive in relation to the potential at the anode of diode D, diode D will block. When diode D is blocked, however, operational amplifier OP can no longer vary its output voltage because both of its input terminals are at the same potential or, in other words, because the clamp voltage $U_K$ at both first resistor R1 and capacitor C is dropping. Output voltage $U_A$ will, as illustrated in FIG. 2, accordingly increase step by step if the attenuation of filter F also increases step by step. If filter F is displaced in the opposite direction, from the shade of highest attenuation to the shade of lowest attenuation, between photodiode S and phototransistor E, the stepped curve illustrated in FIG. 2 will extend in the opposite direction. Output voltage $U_A$ will drop step by step until it equals clamp voltage $U_K$ when the shade of filter F that causes the least attenuation is between photodiode S and phototransistor E.

Connection always occurs at the shade of the filter with the lowest attenuation, the brightest level, that is, in the circuitry illustrated in FIG. 1. If for example the filter is expanded with a shade of even less attenuation and if that shade is inserted between the photodiode S and phototransistor E, the resistance of phototransistor E will decrease. Since this decrease will make the potential at its collector negative in relation to the potential at the anode of diode D, diode D will become conductive. The potential at the non-inverting input terminal of operational amplifier OP will drop because the capacitor C will be discharged through diode D. The voltage at capacitor C will drop below clamp voltage $U_K$ while the clamp voltage $U_K$ at first resistor R1 will continue to decrease. Operational amplifier OP will immediately correct this situation of different voltages at first resistor R1 and capacitor C by reducing its output voltage, and photodiode S will beam less light onto phototransistor E. The light output from photodiode S will be kept low until the resistance of phototransistor E again assumes the level at which clamp voltage $U_K$ drops at the collector-emitter section. In this stable state the collector of phototransistor E and the two input terminals of operational amplifier OP will be at the same potential.

Figure 3:
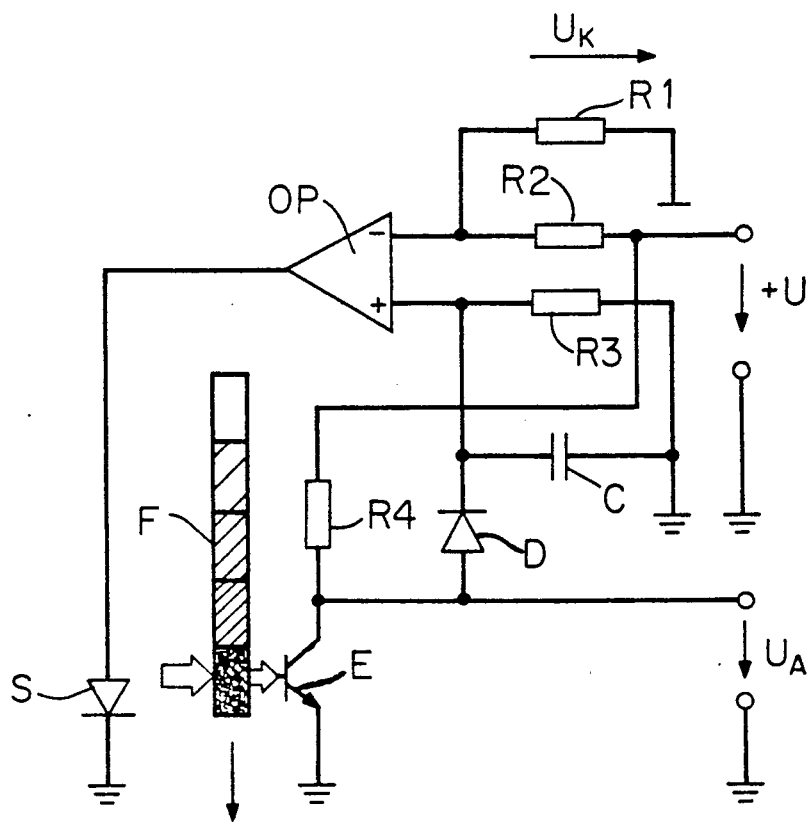
FIG. 3 illustrates circuitry for carrying out the method recited in claim 3.

In FIG. 3 the output terminal of operational amplifier OP is connected to the anode of an optical emitter in the form of a photodiode S, the cathode of which is at reference potential. The inverting input terminal of operational amplifier OP is connected to reference potential through a resistor R1 and to a voltage $+U$ through another resistor R2. The non-inverting input terminal of operational amplifier OP is connected to reference potential through a parallel circuit consisting of a third resistor R3 and a capacitor C. The non-inverting input terminal of operational amplifier OP is also connected to the cathode of a diode D, the anode of which is connected to voltage $+U$ through a fourth resistor R4, and to the collector of an optical receiver E in the form of a phototransistor E. The emitter of phototransistor E is at reference potential. Output voltage $U_A$ is picked up at the collector of phototransistor E.

Figure 4:
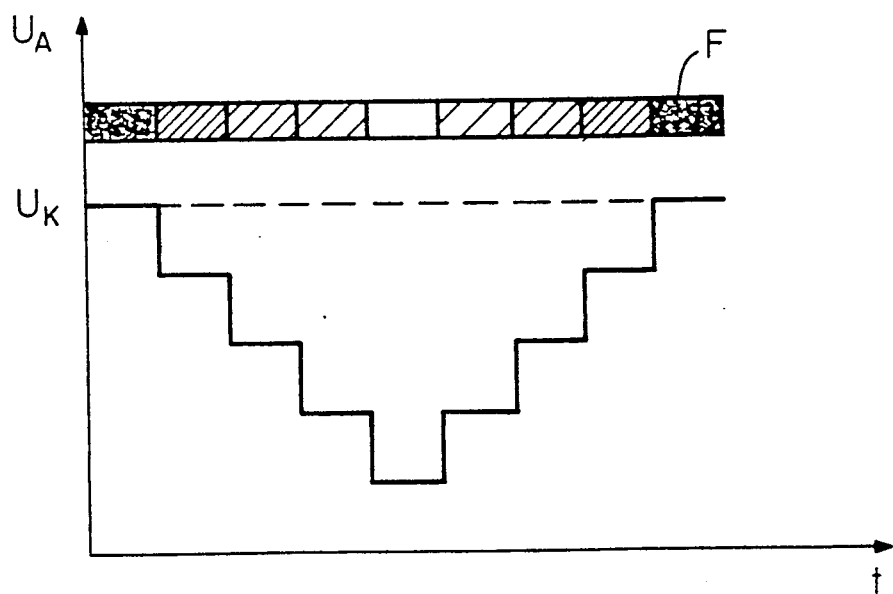
FIG. 4 illustrates output voltage $U_A$ as a function of the shades of gray of a filter F.

The invention will now be specified with reference to FIG. 4.

In FIG. 4 the output voltage $U_A$ picked up at the collector of phototransistor E is plotted as a function of the shades of gray of a filter F.

To facilitate comprehension of the circuitry illustrated in FIG. 3 let it be assumed that the shade of filter F that attenuates the most light initially rests between photodiode S and phototransistor E. Due to the voltage distributor composed of first resistor R1 and second resistor R2 the potential at the inverting input terminal of operational amplifier OP will have a constant value. Operational amplifier OP now changes its output voltage and hence the emission power of photodiode S until the voltage between its two input terminals becomes zero. Since the two input terminals of operational amplifier OP are at the same potential, clamp voltage $U_K$ will drop at capacitor C as well as at first resistor R1.

Assuming that diode D is an ideal diode, the output voltage $U_A$ at the collector of phototransistor E will assume the value of clamp voltage $U_K$ because operational amplifier OP will as aforesaid continue to vary its output voltage and hence the emission power of photodiode S until the resistance of phototransistor E assumes precisely the value at which the clamp voltage $U_K$ at the collector-emitter section will drop. The collector of phototransistor E and both the inverting and non-inverting input terminal of operational amplifier OP will now all be at the same potential, assuming that diode D is an ideal component. Actually, however, the voltage at the collector-emitter section of phototransistor E will be lower than clamp voltage $U_K$ by a factor equaling the diode voltage.

If, now, the filter F between photodiode S and phototransistor E is displaced in such a way that the attenuation will decrease from shade to shade, the resistance of phototransistor E will also decrease. Since the potential at the collector of phototransistor E will accordingly become negative in relation to the potential at the cathode of diode D, diode D will block. When diode D is blocked, however, operational amplifier OP can no longer vary its output voltage because both of its input terminals are at the same potential or, in other words, because the clamp voltage $U_K$ at both first resistor R1 and capacitor C is dropping. Output voltage $U_A$ will, as illustrated in FIG. 2, accordingly decrease step by step if the attenuation of filter F also decreases step by step. If filter F is displaced in the opposite direction, from the shade of lowest attenuation to the shade of highest attenuation, between photodiode S and phototransistor E, the stepped curve illustrated in FIG. 4 will extend in the opposite direction. Output voltage $U_A$ will rise step by step until it equals clamp voltage $U_K$ when the shade of filter F that causes the most attenuation is between photodiode S and phototransistor E.

Connection always occurs at the shade of the filter with the highest attenuation, the darkest level, that is, in the circuitry illustrated in FIG. 3. If for example the filter is expanded with a shade of even more attenuation and if that shade is inserted between the photodiode S and phototransistor E, the resistance of phototransistor E will increase. Since this increase will make the potential at its collector positive in relation to the potential at the cathode of diode D, diode D will become conductive. The potential at the non-inverting input terminal of operational amplifier OP will rise because the capacitor C will be charged through diode D. The decreasing voltage at capacitor C will rise above clamp voltage $U_K$ while the clamp voltage $U_K$ at first resistor R1 will continue to decrease. Operational amplifier OP will immediately correct this situation of different voltages at first resistor R1 and capacitor C by increasing its output voltage, and photodiode S will beam more light onto phototransistor E. The light output from photodiode S will be kept high until the resistance of phototransistor E again assumes the level at which clamp voltage $U_K$ drops at the collector-emitter section. In this stable state the collector of phototransistor E and the two input terminals of operational amplifier OP will be at the same potential.

When for example various periodically recurring luminosities are to be detected by means of the circuitry specified herein, the clamping always occurs at the brightest level in relation to the circuit illustrated in FIG. 1 and at the darkest level in relation to the circuit illustrated in FIG. 3. Changes in the parameters of photodiode S and phototransistor E due to variations in temperature and aging on the part of the components are always compensated for in relation to the circuit illustrated in FIG. 1 by clamping at the brightest level and in relation to the circuit illustrated in FIG. 3 by clamping at the darkest level. To obtain an extensive voltage shift it is practical to make the clamp voltage $U_K$ high in the circuit illustrated in FIG. 3 and low in the circuit illustrated in FIG. 1. The circuitry described herein is appropriate for both light barriers wherein the optical emitter and optical receiver are opposite each other and in reflex couplers.

Thus, the invention can be practically employed in a videorecorder. To obtain clean playback the speed and angular position of the head drum of the videorecorder must be precisely controlled. Dark bars for example are accordingly painted on the circumference of the lid-like rotor of the head-drum motor and travel between a phototransistor E and a photodiode S as in a light barrier. One of the bars is wider than the others and represents the darkest level, at which clamping occurs. The bars are detected by a phototransistor E, the output voltage $U_A$ of which is exploited to activate the stator coils of the head-drum motor.

What is claimed is:

1. An arrangement of compensating for changes in parameters of an optical scanner detecting different luminosities, comprising: an optical receiver and an optical emitter directing light to said optical receiver; said optical receiver having an output voltage; means for comparing said output voltage from said receiver with a reference voltage; means for clamping said output voltage to said reference voltage when the light received by said optical receiver has energy of an extreme value; an operational amplifier having an output terminal connected to one electrode of said optical emitter, said optical emitter comprising a photodiode, said emitter having another electrode connected to a reference potential; said operational amplifier having an inverting input connected to said reference potential through a resistor, said inverting input being connected also to a predetermined voltage through a second resistor; said operational amplifier having a non-inverting input connected to said predetermined voltage through a third resistor, said non-inverting input being connected also to said reference potential through a capacitor; a diode having an anode connected to said non-inverting input of said operational amplifier; said diode having a cathode connected to said predetermined voltage through a fourth resistor; said cathode of said diode being connected also to one electrode of said optical receiver, said optical receiver comprising a photo semiconducting element; said photo semiconducting element having a second cathode connected to said reference potential; said output voltage of said receiver being picked up at said one electrode of said photo semiconducting element.

2. An arrangement of compensating for changes in parameters of an optical scanner detecting different luminosities, comprising: an optical receiver and an optical emitter, said receiver receiving light from said emitter; said optical receiver having an output voltage; means for comparing said output voltage from said receiver with a reference voltage; means for clamping said output voltage to said reference voltage when the light received by said optical receiver has energy of an extreme value; said output voltage from said optical receiver being clamped to said reference voltage when the light energy received by said optical receiver attains a minimum value; an operational amplifier having an output connected to one electrode of said optical emitter, said optical emitter comprising a photodiode; said optical emitter having a second electrode connected to reference potential; said operational amplifier having an inverting input connected to reference potential through a first resistor; said inverting input also being connected to a predetermined voltage through a second resistor; said operational amplifier having a non-inverting input connected to the reference potential through a parallel circuit comprising a third resistor and a capacitor; a diode having a cathode connected to said non-inverting input of said operational amplifier; said diode having an anode connected to said predetermined voltage through a fourth resistor; said anode being connected also to one electrode of said optical receiver, said optical receiver comprising a photo semiconducting element; said photo semiconducting element having another electrode at reference potential; said photo semiconducting element having an output voltage picked up at said one electrode.

* * * * *